United States Patent Office 3,264,247
Patented August 2, 1966

3,264,247
PENTYL ISOBUTYRATE PHOSPHITE PLASTIZER-STABILIZER
Lester Friedman, Beachwood Village, Ohio, assignor, by mesne assignments, to Union Carbide Corporation, a corporation of New York
No Drawing. Original application Sept. 7, 1962, Ser. No. 222,171. Divided and this application July 8, 1965, Ser. No. 478,788
11 Claims. (Cl. 260—30.6)

This application is a division of my copending application, Serial No. 222,171, filed September 7, 1962, now Patent No. 3,219,681.

This invention relates to novel phosphorus esters.

3-hydroxy-2,2,4,4-tetramethyl pentyl isobutyrate is available commercially under the trademark Texanol. It is useful as a plasticizer for polymers but does not have stabilizing properties.

It is an object of the present invention to prepare novel phosphites.

Another object of the invention is to improve the heat and/or oxidative stability of polymer systems, e.g., synthetic resins and natural and synthetic rubbers.

A further object is to simultaneously stabilize and plasticize polymers with a single compound.

Still further objects and the entire scope of applicability of the present invention will become apparent from the detailed description given hereinafter: it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing Texanol phosphites having one of the following formulae:

(1) 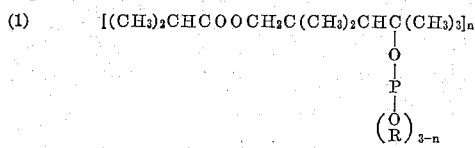

where $n$ is an integer from 1 to 3 and R is alkyl, aryl, haloaryl or

or when $n$ is 2, R can be hydrogen:

(2) 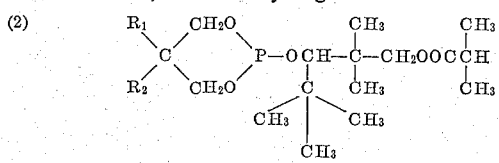

where $R_1$ and $R_2$ are alkyl groups, preferably lower alkyl groups, e.g., methyl, ethyl, propyl, butyl, hexyl; and (3) 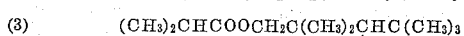

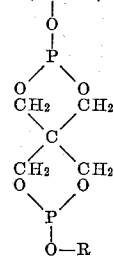

were R is as defined above.

While these are the primary products formed, when 3 mols of Texanol are transesterified with 1 mol of a triaryl or trialkyl phosphite there is some transesterification involving the isobutyryl group.

The compounds of the present invention are useful as combination stabilizers and plasticizers for polymers, such as natural rubber, synthetic rubbers, e.g., butadiene-styrene copolymer (e.g., 75:25 ratio), butadiene-acrylonitrile copolymer (e.g., 80:20 ratio), butadiene-vinyl pyridine copolymer, isobutylene-isoprene copolymer (e.g., 97:3 ratio), linear polyesters, e.g., polyethylene terephthalate (Mylar) and other polyesters, as disclosed in Whinfield Patent 2,465,319, polyamides of the nylon type, e.g., polymeric hexamethylene adipamide and other polyamides, as shown in Carothers Patent 2,071,250, as well as caprolactam polymer, polyolefins, such as polyethylene, polybutylene and especially polypropylene and copolymers of ethylene and propylene (e.g., a 50:50 copolymer), halogen-containing vinyl polymers, e.g., polyvinyl chloride, vinyl chloride-vinyl acetate copolymer (87:13 ratio), vinyl chloride-acrylonitrile copolymer (85:15 ratio), vinylidene chloride-vinyl chloride copolymer (85:15 ratio), and vinylidene chloride-acrylonitrile copolymer (80:20 ratio), acrylonitrile polymers, e.g., polyacrylonitrile, acrylonitrile-vinyl chloride copolymer (85:15 ratio).

The compounds of the present invention are effective as heat and light stabilizers and are normally used in an amount of 0.1 to 10% by weight of the polymer being stabilized. Thus, 2% of Texanol bis phenyl phosphite can be added to polyvinyl chloride to stabilize the same, and 1% of either bis Texanol phenyl phosphite or bis Texanol pentaerythritol diphosphite can be added to polypropylene as a stabilizer.

To take advantage of the plasticizing properties of the compounds of the present invention there can be added 10% to 100% of these compounds based on the weight of the resin, e.g., 60 parts of bis-Texanol phenyl phosphite can be added to 100 parts of polyvinyl chloride. The bis-Texanol phenyl phosphite also acts to stabilize the polyvinyl chloride.

The compounds can also be used as antioxidants for lubricating oils, e.g., in an amount of 0.1% to 10% by weight of lube oil being stabilized.

It is also possible to oxidize the compounds of the present invention to the corresponding phosphates or sulfurize them to the corresponding thiophosphates in accordance with conventional techniques.

For convenience throughout the specification in describing phosphites the radical 3-[1-isobutyryloxy 2,2,4,4-tetramethyl pentyl] will be called Texanyl.

As examples of compounds within Formula 1 there can be prepared and used in accordance with the invention 3-[1-isobutyryloxy 2,2,4,4-tetramethyl pentyl] bis-phenyl phosphite (Texanyl bis-phenyl phosphite), bis-Texanyl phenyl phosphite, tris-Texanyl phosphite, bis-Texanyl p-cresyl phosphite, Texanyl bis-o-cresyl phosphite, bis-Texanyl 2,4-xylenyl phosphite, Texanyl bis-o-butylphenyl phosphite, Texanyl bis-methyl phosphite, bis-Texanyl ethyl phosphite, bis-Texanyl decyl phosphite, Texanyl bis-isooctyl phosphite, Texanyl bis-octadecyl phosphite, bis-Texanyl m-chlorophenyl phosphite, Texanyl-bis-p-chlorophenyl phosphite, and bis-Texanyl phosphite (bis-Texanyl hydrogen phosphonate).

Examples of compounds within Formula 2 which can be prepared and used in accordance with the invention include Texanyl neopentylene phosphite, Texanyl neohexylene phosphite, 2-Texanyloxy-5,5-diethyl 1,3,2-dioxaphosphorinane and 2-Texanyloxy-5-propyl-5-butyl-1,3,2-dioxaphosphorinane.

Examples of compounds within Formula 3 which can be prepared and used in accordance with the invention include bis-Texanyl pentaerythritol diphosphite, Texanyl p-cresyl pentaerythritol diphosphite, Texanyl p-cresyl pentaerythritol diphosphite, Texanyl o-chlorophenyl pentaerythritol diphosphite, Texanyl ethyl pentaerythritol diphosphite, Texanyl decyl pentaerythritol diphosphite and Texanyl octadecyl pentaerythritol diphosphite.

Unless otherwise indicated, all parts and percentages are by weight.

Compounds within Formula 1 (when R is not hydrogen) can be prepared by reacting Texanol with a triaryl or trihaloaryl or trialkyl phosphite and removing the phenol or alcohol formed by distillation, preferably in vacuo, e.g., under a vacuum of 10–20 mm. If 3 or more mols, e.g., 5 mols, of the Texanol are employed per mol of the phosphite, e.g., triphenyl phosphite, then $n$ in Formula 1 will be 3. If 2 mols of the Texanol are used per mol of triphenyl phosphite, then $n$ will be 2 in Formula 1, and if 1 mol of Texanol is used per mol of triphenyl phosphite, then $n$ will be 1 in Formula 1. The alkanol formed preferably should boil below Texanol, although the boiling point of the phenol formed is immaterial.

Compounds within Formula 1 when R is hydrogen can be prepared by reacting 2 mols of Texanol with one mol of a dialkyl phosphite, e.g., dimethyl phosphite, dibutyl phosphite and dihexyl phosphite or a diaryl phosphite, e.g., diphenyl phosphite. Alternatively, they can be prepared by hydrolyzing a bis-Texanyl aryl or alkyl phosphite with one equivalent of water.

Compounds within Formula 2 can be prepared by heating a mixture of (a) 1 mol of Texanol, (b) 1 mol of a neoalkanediol having 1 carbon atom between the carbon atoms attached to the hydroxyl groups, and (c) 1 mol of a triaryl or trihaloaryl or trialkyl phosphite. The reaction is completed by heating the mixture, preferably in vacuo, e.g., 10–20 mm., to remove the phenol or alkanol formed. Preferably, the alkanol should be one boiling below the neoalkanediol, although the boiling point of the phenol formed is not critical.

An alternative method of forming the compounds of Formula 2 is to react 1 mol of an aryl or haloaryl or alkyl neoalkylene phosphite wherein the neoalkylene group is that of a 1,3-glycol with 1 mol of Texanol.

As the neoalkanediol there can be used any 2,2-dialkyl-1,3-alkanediol, such as neopentylene glycol, neohexylene glycol (2-methyl-2-ethyl-1,3-propanediol), 2,2-diethyl-1,3-propanediol, 2-methyl-4-butyl-1,3-propanediol, 2-propyl-2-butyl-1,3-propanediol.

In order to make the compounds of Formula 3 there are reacted by heating 2 mols of Texanol with 1 mol of pentaerythritol and 2 mols of a triaryl or trihaloaryl or trialkyl phosphite if it is desired to make bis-Texanyl pentaerythritol diphosphite. The phenol or alkanol formed is removed by distillation. To make compounds of Formula 3 where R is alkyl, aryl or haloaryl, the same reaction is employed except only 1 mol of Texanol is used.

As the triaryl or trihaloaryl or trialkyl phosphite in making the compounds of Formulae 1, 2 and 3 there can be used triphenyl phosphite, tri o-cresyl phosphite, tri-p-cresyl phosphite, tri-m-cresyl phosphite, tri-2,4-xylenyl phosphite, triethyl phosphite, trimethyl phosphite, diphenyl butyl phosphite, tributyl phosphite, tris-decyl phosphite, tri-p-chlorophenyl phosphite.

All of the reactions set forth above for preparing the compounds of Formulae 1, 2 and 3 are preferably catalyzed with 0.05–5% of a diaryl phosphite or dialkyl phosphite, e.g., diphenyl phosphate, di-o-cresyl phosphite, di p-cresyl phosphite, dimethyl phosphite, bis-neopentyl phosphite, or dibutyl phosphite. Alternatively, an alkaline catalyst can be used, e.g., 0.05–5% of sodium phenolate, sodium cresylate, potassium phenolate, sodium methylate, bis sodium neopentylene glycolate. When alkaline catalysts are employed preferably they have a pH of at least 11 in a 0.1 N solution.

*Example 1*

Texanol (1 mol), triphenyl phosphite (310 grams, 1 mol) and 1 gram of diphenyl phosphite catalyst were heated in vacuo at 120–131° C. Phenol (B.P. 85–88°/14 mm.) was collected overhead in an amount of 93–95 grams. The residual liquid was essentially pure Texanyl bis phenyl phosphite. It was thermally stable to at least 250° C. and was effective e.g., in an amount of 2 parts per 100 parts of polyvinyl chloride in augmenting the thermal stability characteristics of the polyvinyl chloride.

*Example 2*

The procedure of Example 1 was repeated replacing the 1 mol Texanol by 2 mols of Texanol to give bis-Texanyl phenyl phosphite as a clear, colorless, non-distillable liquid residue in the reaction vessel.

*Example 3*

The reaction of 3 mols of Texanol with 1 mol of triphenyl phosphite in the presence of 1.5 grams of diphenyl phosphite went quite well to give the bis Texanyl phenyl phosphite as indicated by the amount of phenol distilled off and collected, about 190 grams. To distill out the remaining amount of phenol required a long reaction time, 48 hours and increased amounts of catalyst, 10 grams. The product of such further reaction is a mixture of tris Texanol phosphites include tri-Texanyl phosphite and a compound wherein apparently the isobutyryl group also entered into the transesterification reaction with the triphenyl phosphite.

*Example 4*

Diphenyl pentaerythritol diphosphite (480 grams, 1 mol) was transesterified with 2 moles of Texanol in the presence of 2 grams of diphenyl phosphite, the phenol formed was removed by distillation in the vacuum, 10–15 mm., in an amount of 185 grams. The residue was essentially pure bis-Texanyl pentaerythritol diphosphite. At low temperatures the liquid product solidifies to a brittle glass. This compound was extraordinarily thermally stable and was suitable, e.g., in an amount of 2%, for stabilizing polymers including polyvinyl chloride, polyethylene and polypropylene.

*Example 5*

The procedure of Example 4 was repeated using only 1 mol of Texanol to produce as the product Texanyl phenyl penetaerythritol diphosphite.

*Example 6*

The procedure of Example 4 was repeated replacing the diphenyl pentaerythritol diphosphite by 1 mol of diethyl pentaerythritol diphosphite and using only 1 mol of Texanol to form Texanyl ethyl pentaerythritol diphosphite.

*Example 7*

The procedure of Example 1 was repeated replacing the triphenyl phosphite by 1 mol of tributyl phosphite and using 1 gram dibutyl phosphite as the catalyst to produce Texanyl bis-butyl phosphite.

*Example 8*

1 mol of Texanol, 1 mol of neopenthylene glycol and 1 mol (310 grams) of triphenyl phosphite where heated in the presence of 2.0 grams of diphenyl phosphite as a catalyst in a vacuum, 10–15 mm. at 120–140° C. the phenol formed was removed by distillation. After completion of the reaction there remained in the pot Texanyl neopentylene phosphite.

Example 9

100 grams of solid propylene (melt index at 190° C. of 0.8) was stabilized by adding 2 grams of bis Texanyl phenyl phosphite.

Example 10

Texanol (1 mol), dibutyl phosphite (97 gram, 0.5 mol) were heated in vacuo (10 mm.) at 120–130° C. Butanol was removed overhead and collected in a Dry Ice trap. Towards the end of the reaction, the pot temperature was raised to 150° C. and the pressure lowered to 5 mm. A nitrogen stream was used to aid in removing the last of the butanol. The pot residue after cooling and filtering with a little filter aid alkaline clay was essentially pure bis Texanol phosphite. IR spectrum showed P—H stretching at $4.0\mu$ + P—O at $8.0\mu$. The product was bis-Texanyl phosphite (bis-Texanyl hydrogen phosphonate).

Example 11

The same compound as that of Example 10 was also prepared by hydrolyzing with one equivalent of water the compound obtained in Example 2 and removing in vacuo the by-product phenol formed.

I claim:
1. A member of the group consisting of polymers of a conjugated diene hydrocarbon, a halogen containing polymer of an ethylenically unsaturated monomer, a linear polyester nylon and a polymer of a monoolefin having 2 to 4 carbon atoms together with a compound having one of the formulae

(1) 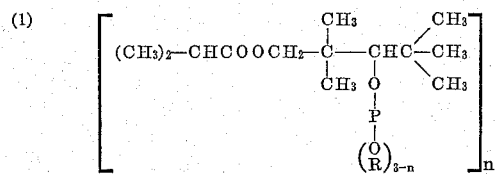

(2) 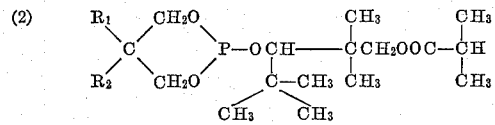

and (3) 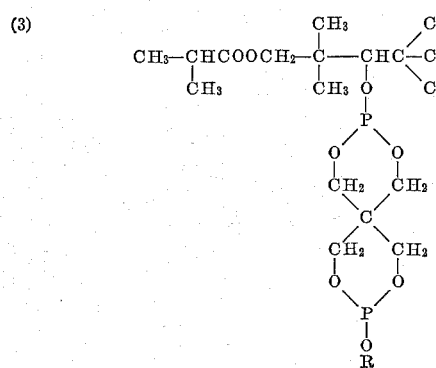

where $n$ is an integer form 1 to 3, R is selected from the group consisting of alkyl, aryl and haloaryl when $n$ is 1 or 3, and R is selected from the group consisting of alkyl, aryl, haloaryl and hydrogen when $n$ is 2, and $R_1$ and $R_2$ are alkyl.

2. A composition comprising a polymer of a monoolefin having 2 to 4 carbon atoms together with a compound having one of the formulae (1) 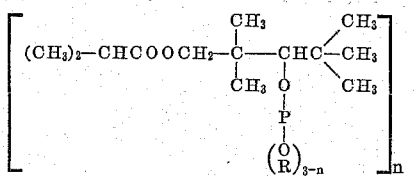

(2) 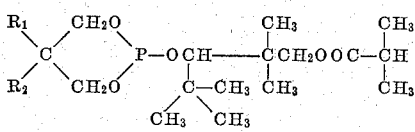

and (3) 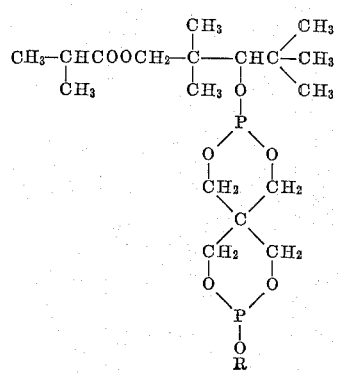

where $n$ is an integer from 1 to 3, R is selected from the group consisting of alkyl, aryl and haloaryl when $n$ is 1 or 3, and R is selected from the group consisting of alkyl, aryl, haloaryl and hydrogen when $n$ is 2, and $R_1$ and $R_2$ are alkyl.

3. A composition according to claim 2 wherein the polymer is polypropylene.

4. A composition comprising a halogen containing polymer of an ethylenically unsaturated monomer together with a compound having one of the formulae (1) 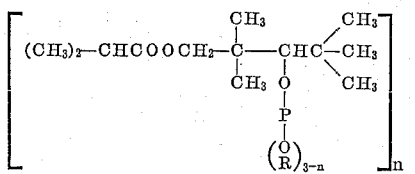

(2) 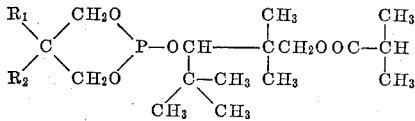

and (3) 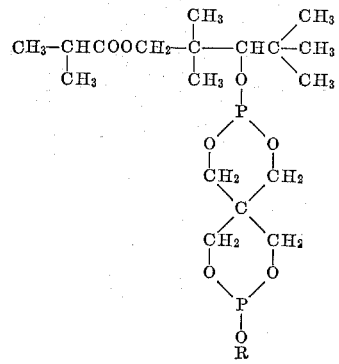

where $n$ is an integer from 1 to 3, R is selected from the group consisting of alkyl, aryl and haloaryl when $n$ is 1 or 3, and R is selected from the group consisting of alkyl, aryl, haloaryl and hydrogen when $n$ is 2, and $R_1$ and $R_2$ are alkyl.

5. A composition according to claim 4 wherein the polymer is a vinyl chloride resin.

6. A composition according to claim 2 wherein the compound has Formula 1.

7. A composition according to claim 2 wherein the compound has Formula 2.

8. A composition according to claim 2 wherein the compounds has Formula 3.

9. A composition according to claim 4 wherein the compound has Formula 1.

10. A composition according to claim 4 wherein the compounds has Formula 2.

11. A composition according to claim 4 wherein the compound has Formula 3.

No references cited.

MORRIS LIEBMAN, *Primary Examiner.*

J. S. WALDRON, *Assistant Examiner.*